(12) United States Patent
Azusawa

(10) Patent No.: US 10,680,475 B2
(45) Date of Patent: Jun. 9, 2020

(54) ROTOR FOR ROTARY ELECTRIC MACHINE

(71) Applicant: HONDA MOTOR CO., LTD., Tokyo (JP)

(72) Inventor: Keisuke Azusawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 15/902,303

(22) Filed: Feb. 22, 2018

(65) Prior Publication Data

US 2018/0241266 A1   Aug. 23, 2018

(30) Foreign Application Priority Data

Feb. 22, 2017   (JP) .................................. 2017-031531

(51) Int. Cl.
*H02K 1/27*     (2006.01)
*H02K 29/03*    (2006.01)

(52) U.S. Cl.
CPC ........... *H02K 1/2766* (2013.01); *H02K 1/276* (2013.01); *H02K 29/03* (2013.01); *H02K 2213/03* (2013.01)

(58) Field of Classification Search
CPC ............................... H02K 1/27; H02K 1/2766
USPC .......................... 310/156.53, 156.56, 156.57
See application file for complete search history.

(56) References Cited

U.S. PATENT DOCUMENTS

| 7,560,842 | B2 * | 7/2009 | Hattori | H02K 1/2766 310/156.53 |
| 7,791,236 | B2 * | 9/2010 | Liang | H02K 1/2766 310/156.07 |
| 10,211,692 | B2 * | 2/2019 | Kuo | H02K 1/2766 |
| 2005/0104468 | A1 * | 5/2005 | Araki | H02K 1/2766 310/156.53 |
| 2007/0126304 | A1 | 6/2007 | Ito et al. | |
| 2010/0301697 | A1 * | 12/2010 | Takahashi | H02K 1/2766 310/156.53 |
| 2013/0119812 | A1 | 5/2013 | Takizawa et al. | |

(Continued)

FOREIGN PATENT DOCUMENTS

| JP | H07-336917 A | 12/1995 |
| JP | 2002-078260 A | 3/2002 |

(Continued)

OTHER PUBLICATIONS

May 7, 2019, Japanese Office Action issued for related JP Application No. 2017-031531.

(Continued)

*Primary Examiner* — Hanh N Nguyen
(74) *Attorney, Agent, or Firm* — Paratus Law Group, PLLC

(57) ABSTRACT

There is provided a rotor for a rotary electric machine including a rotor core of an approximately annular shape having a plurality of magnet inserting holes formed at predetermined intervals in a circumferential direction thereof, and a plurality of permanent magnets inserted into the magnet inserting holes. A rotor yoke on at least an outer circumferential side relative to the magnet inserting holes of the rotor core is formed of a magnetic material. The outer circumferential side relative to the magnet inserting holes of the rotor core has a hole portion approximately on a d-axis of each magnetic poles formed by the permanent magnets.

6 Claims, 10 Drawing Sheets

(56) References Cited

U.S. PATENT DOCUMENTS

2013/0278106 A1* 10/2013 Kim ................ H02K 1/2766
                                                    310/156.53
2014/0191607 A1*  7/2014 Huang .............. H02K 1/246
                                                    310/156.08

FOREIGN PATENT DOCUMENTS

| JP | 2004-007875 A | 1/2004 |
| JP | 2007-159196 A | 6/2007 |
| JP | 5278003 B2 | 9/2013 |
| JP | 2016-073139 A | 5/2016 |
| WO | WO 2012/008012 A1 | 1/2012 |
| WO | WO 2012/014836 A1 | 2/2012 |

OTHER PUBLICATIONS

Sep. 4, 2018, Japanese Office Action issued for related JP application No. 2017-031531.

* cited by examiner

ROTOR FOR ROTARY ELECTRIC MACHINE

CROSS-REFERENCE TO RELATED APPLICATION

This application claims priority from Japanese Patent Application No. 2017-031531 filed on Feb. 22, 2017, the entire contents of which are incorporated herein by reference.

TECHNICAL FIELD

The present invention relates to a rotor for a rotary electric machine.

BACKGROUND ART

As a rotor used in a rotary electric machine, there has been known a rotor in which a plurality of permanent magnets are arranged in a rotor core at predetermined intervals in a circumferential direction (for example, see JP-B-5278003, JP-A-2002-78260 and WO2012/014836).

A rotor for an electric motor described in JP-B-5278003 reduces torque ripples and iron loss by arranging a position of a groove, which is provided in an outer circumferential portion of the rotor, at an electric angle of 40° to 44° with respect to a center line of a magnetic pole closest to the groove. Alternatively, the electric angle is set to 44° to 53° to reduce harmonic components in a no-load induced voltage. A rotor for a permanent magnet motor described in JP-A-2002-78260 prevents a rise in peak value caused by harmonic components included in an induced voltage to enable high-speed rotation by setting an angle between two outer circumferential grooves provided in an outer circumferential portion of a rotor core to be equal to an angle between two magnetic poles at a stator side. A rotor described in WO2012/014836 reduces cogging torque and torque ripples by reducing an outer diameter of a rotor core as approaching to both circumferential ends of a pole pitch angle from a center of a magnetic pole.

Since the torque ripple is a major factor of annular vibration of the rotor, vibration and noise of the rotor can be further suppressed if the torque ripple can be reduced. The torque ripple can be reduced by the techniques described in JP-B-5278003, JP-A-2002-78260 and WO2012/014836. However, it is desired to further reduce the torque ripple in order to improve silence of a vehicle which includes a rotary electric machine mounted thereon.

SUMMARY

An aspect of the present invention provides a rotor for a rotary electric machine capable of reducing torque ripples.

According to an aspect of the present invention, there is provided (1) a rotor for a rotary electric machine (e.g., a rotor 10 for a rotary electric machine in an embodiment) includes:

a rotor core (e.g., a rotor core 20 in an embodiment) of an approximately annular shape having a plurality of magnet inserting holes (e.g., magnet inserting holes 40 in an embodiment) formed at predetermined intervals in a circumferential direction thereof; and a plurality of permanent magnets (e.g., permanent magnets 30 in an embodiment) inserted into the magnet inserting holes, wherein a rotor yoke (e.g., a rotor yoke 40d in an embodiment) on at least an outer circumferential side relative to the magnet inserting holes of the rotor core is formed of a magnetic material (e.g., electromagnetic steel sheets 21 in an embodiment), and wherein the outer circumferential side relative to the magnet inserting holes of the rotor core has a hole portion (e.g., a hole portion 45 in an embodiment) approximately on a d-axis of each of magnetic poles (e.g., magnetic pole parts 50 in an embodiment) formed by the permanent magnets.

(2) In the rotor of (1),
the hole portion may be a long hole having a major axis directed in a radial direction of the rotor core.

(3) In the rotor of (2),
the rotor core may be formed of stacked steel sheets (e.g., electromagnetic steel sheets 21 in an embodiment), and a width (e.g., a width W in a direction of a minor axis in an embodiment) of the hole portion in a direction of a minor axis may be equal to or greater than twice of a thickness (e.g., a thickness t in an embodiment) of one steel sheet forming the rotor core.

(4) In the rotor of (2) or (3),
a depth (e.g., a depth D in an embodiment) from an outer circumferential surface of the rotor core to a center of the hole portion in a direction of the major axis may be less than a half of a thickness (e.g., a thickness T in an embodiment) of the rotor yoke in a direction of the d-axis.

Advantages

According to the rotor of (1), since the hole portion is provided at the outer circumferential side relative to the magnet inserting hole of the rotor core approximately on the d-axis of each of the magnetic poles formed by the permanent magnets, torque ripples of the rotary electric machine can be reduced. Also, since the hole portion is provided, a change in magnetic flux in a gap between the outer circumferential surface of the rotor core and the stator can be prevented. Thus, magnetic loss is prevented. Further, since the hole portion is provided, weight of the outer circumferential side relative to the magnet inserting hole of the rotor core is reduced. Thus, a centrifugal force occurring during rotation is reduced, so that the rotor can be rotated at a higher speed.

According to the rotor of (2), since the hole portion is the long hole having the major axis directed in the radial direction of the rotor core, torque in a region of a low advance angle is not reduced, and the torque ripple can be reduced in a region in which an advance angle is advanced.

According to the rotor of (3), since the width of the hole portion in the direction of the minor axis is equal to or greater than twice of the thickness of one steel sheet forming the rotor core formed of stacked steel sheets, wear of a metal mold can be reduced when the steel sheets are formed by punching using the metal mold. As a result, a life of the metal mold is prolonged.

According to the rotor of (4), since the depth from the outer circumferential surface of the rotor core to the center of the hole portion in the direction of the major axis is less than the half of the thickness of the rotor yoke in the direction of the d-axis, an effect of reducing the torque ripple due to the hole portion is larger.

DESCRIPTION OF EMBODIMENT

Hereinafter, embodiments of the present invention will be described with reference to the drawings.

First Embodiment

Figure 1:
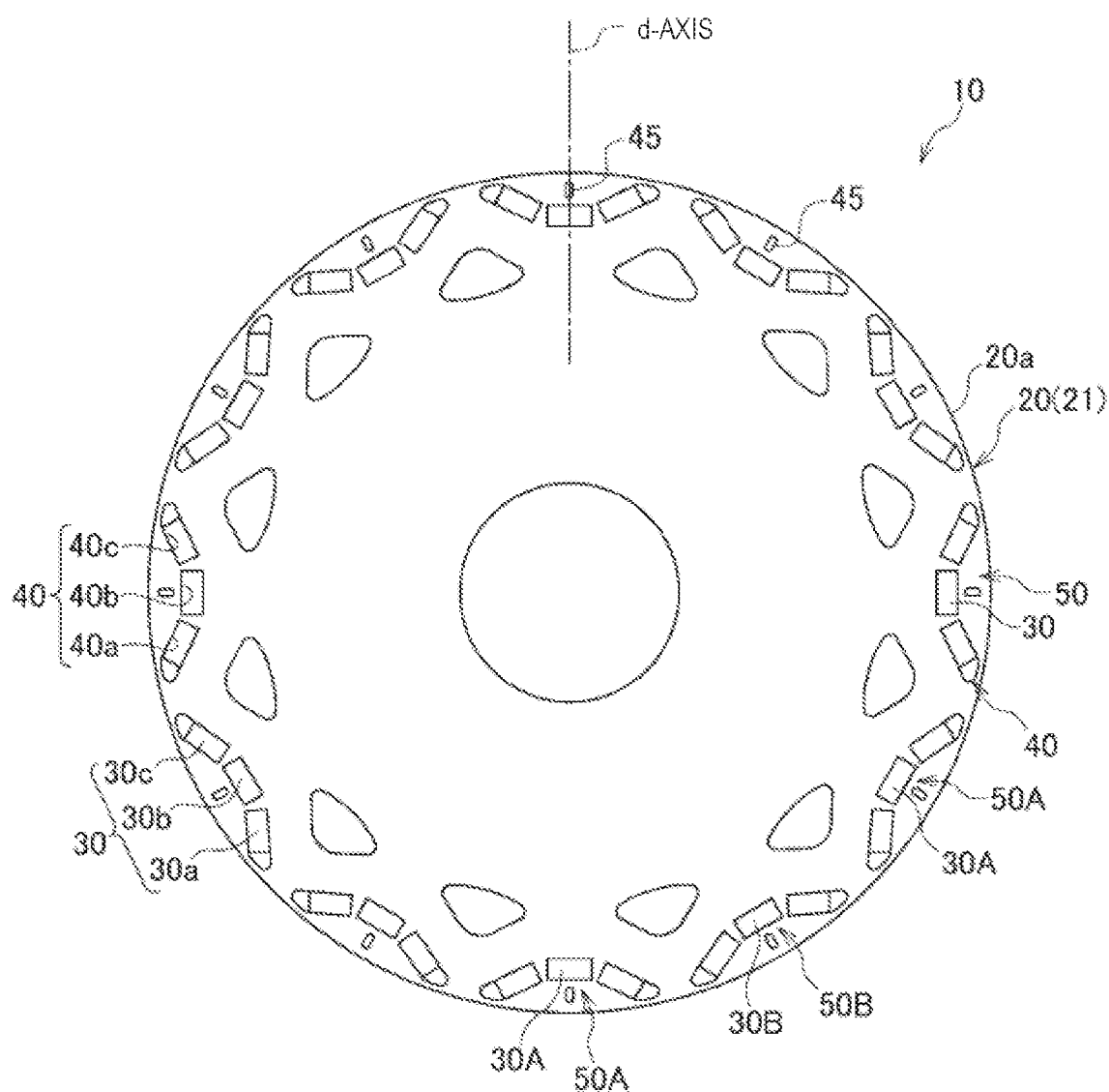
FIG. 1 is a front view of a rotor for a rotary electric machine according to a first embodiment.
Figure 2:
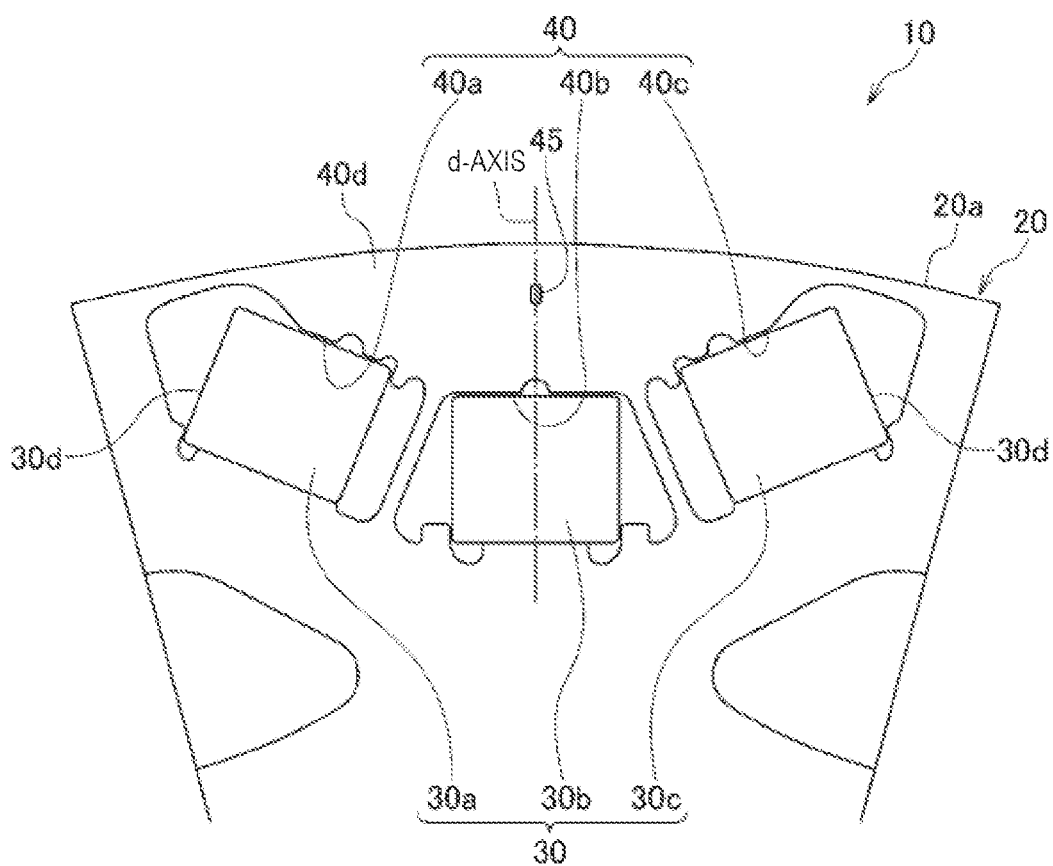
FIG. 2 is an enlarged view illustrating one magnetic pole part in the rotor for the rotary electric machine illustrated in FIG. 1.
Figure 3:
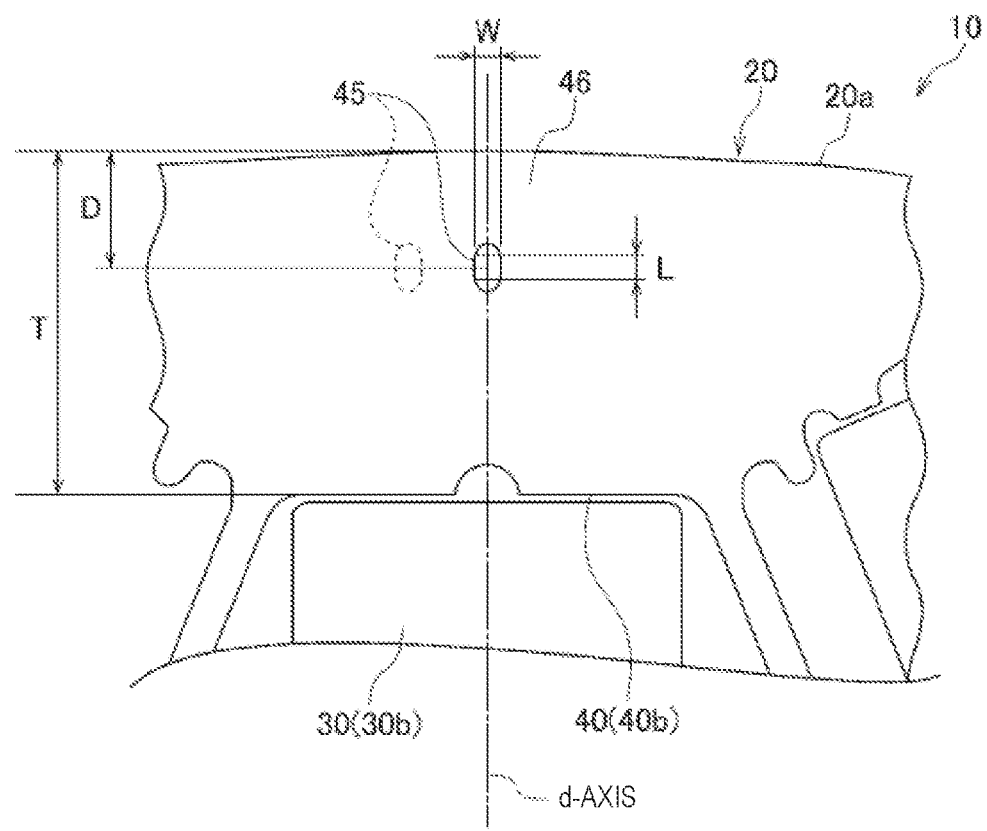
FIG. 3 is an enlarged front view of a main part of the rotor for the rotary electric machine illustrated in FIG. 2.

FIG. 1 is a front view of a rotor for a rotary electric machine according to a first embodiment. FIG. 2 is an enlarged view illustrating one magnetic pole part in the rotor for the rotary electric machine illustrated in FIG. 1. FIG. 3 is an enlarged front view of a main part of the rotor for the rotary electric machine illustrated in FIG. 2.

In the rotary electric machine, a rotor 10 having a plurality of permanent magnets 30 is rotatably provided at an inner circumferential side of a stator (not shown) having an annular shape. The rotor 10 is configured to rotate by applying a current to coils wound around the stator.

As illustrated in FIGS. 1 to 3, the rotor 10 of the rotary electric machine of the present embodiment includes a rotor core 20 formed with a plurality of magnet inserting holes 40 in a circumferential direction thereof, and the permanent magnets 30 which are inserted into and fixed in the magnet inserting holes 40.

The rotor core 20 is formed by stacking a plurality of electromagnetic steel sheets 21 formed approximately in the same annular shape by punching, and the plurality of magnet inserting holes 40 are formed in an outer circumferential portion of the rotor core 20 at predetermined intervals in a circumferential direction. The electromagnetic steel sheets 21 are formed of a magnetic material.

Each of the magnet inserting holes 40 has three holes 40a, 40b and 40c divided into three in a circumferential direction. The three holes 40a, 40b and 40c are arranged in an approximately V shape such that longitudinal center lines of the adjacent holes in a circumferential direction form an angle less than 180°.

Each of the permanent magnets 30 has three permanent magnet pieces 30a, 30b and 30c divided into three in a circumferential direction. The three permanent magnet pieces 30a, 30b and 30c are formed in an approximately rectangular shape having the same cross section. The permanent magnet pieces 30a, 30b and 30c are inserted respectively into and fixed in the three holes 40a, 40b and 40c of the magnet inserting holes 40 of the rotor core 20.

The three permanent magnet pieces 30a, 30b and 30c, which are inserted into and fixed in the magnet inserting holes 40, form one magnetic pole part 50. The magnetic pole parts 50 of the rotor 10 are magnetized in a radial direction of the rotor 10, and magnetizing directions thereof are different from one another in a circumferential direction. Specifically, as illustrated in FIG. 1, in a magnetic pole part 50A configured by insertion of a permanent magnet 30A into the magnet inserting hole 40, when an outer circumferential side thereof is set to an N pole, a permanent magnet 30B is configured by insertion into the magnet inserting hole 40 such that the adjacent magnetic pole part 50B becomes an S pole at an outer circumferential side thereof.

In the present embodiment, a hole portion 45 having a major axis directed in the radial direction of the rotor core 20 is formed on a d-axis of each of the magnetic pole parts 50 at a rotor yoke 40d forming an outer circumferential side relative to the magnet inserting hole 40 of the rotor core 20. When the hole portion 45 is provided as an air gap on the d-axis of the outer circumferential side relative to the magnet inserting hole 40, a magnetic flux of the permanent magnet 30 is obstructed by the hole portion 45. The hole portion 45 formed as the air gap may be filled with a nonmagnetic material such as a resin. The hole portion 45 is not limited to being provided on the d-axis, but it may be provided in the vicinity of (approximately on) the d-axis as indicated in FIG. 3 by a broken line. However, in this case, the major axis of the hole portion 45 is also directed in the radial direction of the rotor core 20.

As illustrated in FIG. 3, a width W (hereinafter referred to simply as "width W") in a direction of a minor axis of the hole portion 45 is equal to and greater than twice of a thickness t of one electromagnetic steel sheet 21 forming the rotor core 20. That is, the width has a relation of "W≥2t." If the hole portion 45 has the width W satisfying this relation, wear of a metal mold is reduced when the electromagnetic steel sheet 21 is formed by punching using the metal mold, and a life of the metal mold is prolonged.

A length L (hereinafter referred to simply as "length L") in a direction of the major axis of the hole portion 45 is set to an optimum value which takes into account torque ripple or output torque of the rotary electric machine.

A depth D (hereinafter referred to simply as "depth D") from an outer circumferential surface 20a of the rotor core 20 to the center of the hole portion 45 in the direction of the major axis thereof is set to be less than a half of a thickness T of the rotor yoke 40d in the direction of the d-axis. That is, the depth has a relation of "D<T/2." The respective setting values of the width W, length L, and depth D will be described below.

Figure 4:
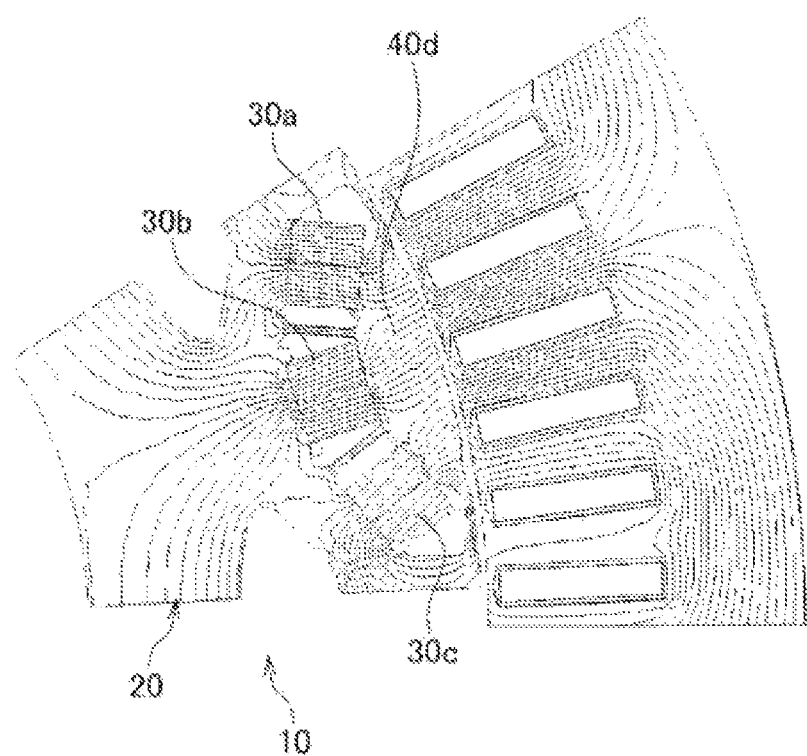
FIG. 4 is an enlarged view of a main part illustrating an example of a magnetic path at low torque output of the rotary electric machine.
Figure 5:
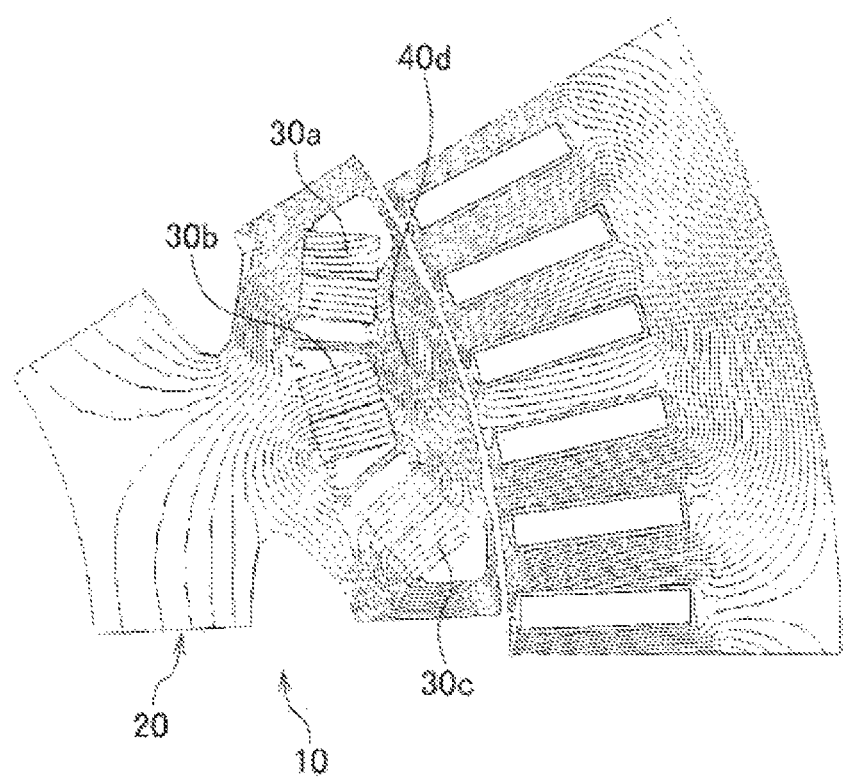
FIG. 5 is an enlarged view of a main part illustrating an example of a magnetic path at high torque output of the rotary electric machine.

In the rotary electric machine including the rotor 10 configured as described above, the rotor 10 is rotatably provided at an inner circumferential side of the stator (not shown), when a current is applied to coils of the stator, a rotating magnetic field is generated in the stator. The rotor 10 rotates in accordance with the rotating magnetic field generated in the stator, so that the rotary electric machine outputs torque. FIG. 4 is an enlarged view of a main part illustrating an example of a magnetic path at low torque output of the rotary electric machine, and FIG. 5 is an enlarged view of a main part illustrating an example of a magnetic path at high torque output of the rotary electric machine. In FIGS. 4 and 5, a configuration in which a wire is wound once around each tooth of the stator is illustrated, but the wire may be e wound more than once.

As illustrated in FIG. 4, a magnetic path is formed at the rotor yoke 40d, which forms the outer circumferential side relative to the magnet inserting hole 40 of the rotor core 20, in the radial direction of the rotor core 20 when the rotary electric machine, in which an advance angle of the current flowing along the coils of the stator is low, outputs the low torque. At this time, the hole portion 45 provided on the d-axis of the rotor yoke 40d does not obstruct the magnetic path formed at the rotor yoke 40d because the major axis thereof has a shape in which it is directed in the radial direction of the rotor core 20. Therefore, in a region in which the rotary electric machine has the low advance angle, a reduction in torque due to an influence of the hole portion 45 is suppressed. On the other hand, as illustrated in FIG. 5, a magnetic path is formed at the rotor yoke 40d, which forms the outer circumferential side relative to the magnet inserting hole 40 of the rotor core 20, in the circumferential direction of the rotor core 20 when the rotary electric machine, in which the advance angle of the current flowing along the coils of the stator is advanced, outputs the high torque. The hole portion 45 obstructs the magnetic path formed at the rotor yoke 40d because the major axis thereof has a shape which is directed in the radial direction of the rotor core 20. As a result, in a region in which the advance angle of the rotary electric machine is advanced, a reduction in torque ripple due to an influence of the hole portion 45 can be realized.

Next, the setting values of the length L, depth D and width W of the hole portion 45 will be described.

Figure 6:
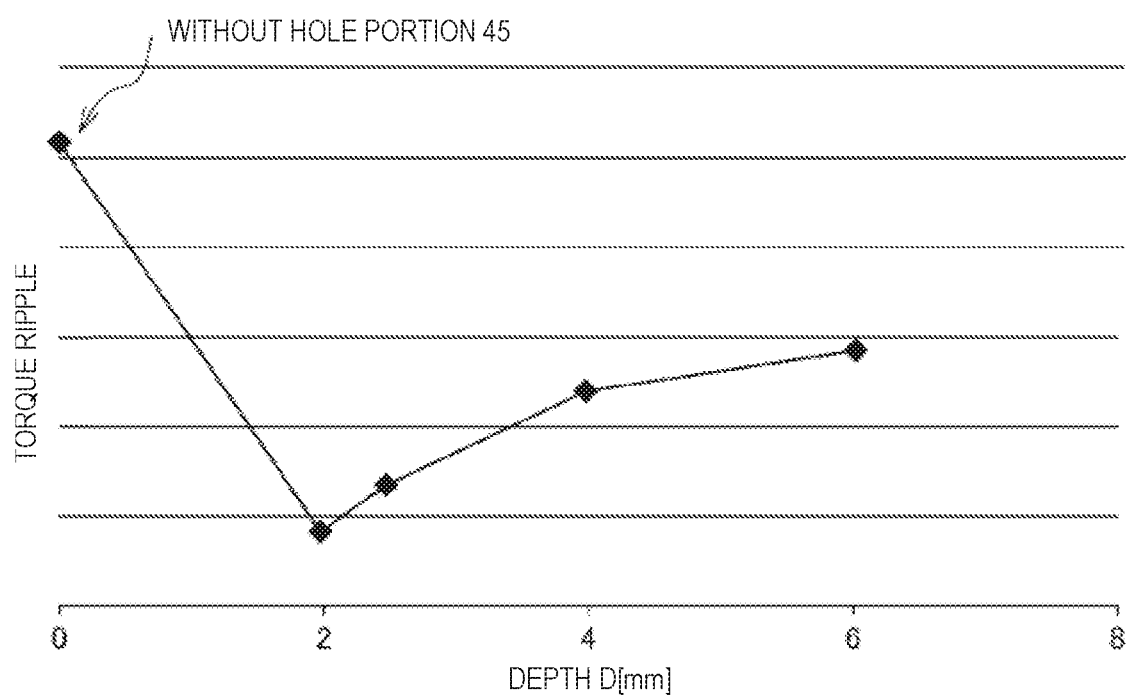
FIG. 6 is a graph illustrating a relation between a depth from a rotor outer circumference of a hole portion and torque ripple of the rotary electric machine.

FIG. 6 is a graph illustrating a relation between the depth D of the hole portion 45 from an outer circumferential surface 20a of the rotor core 20 and the torque ripple of the rotary electric machine. As illustrated in FIG. 6, as the depth D of the hole portion 45 becomes smaller, the torque ripple is reduced, and an effect of reducing the torque ripple due to the hole portion 45 is increased. However, when the hole portion 45 excessively approaches the outer circumferential surface 20a, a linking part 46 between the hole portion 45 and the outer circumferential surface 20a becomes thin, and mechanical strength is reduced. Thus, the depth is preferably set to about D=2 mm. The hole portion 45 set to the depth D of about 2 mm has the aforementioned relation of "D<T/2."

Figure 7:
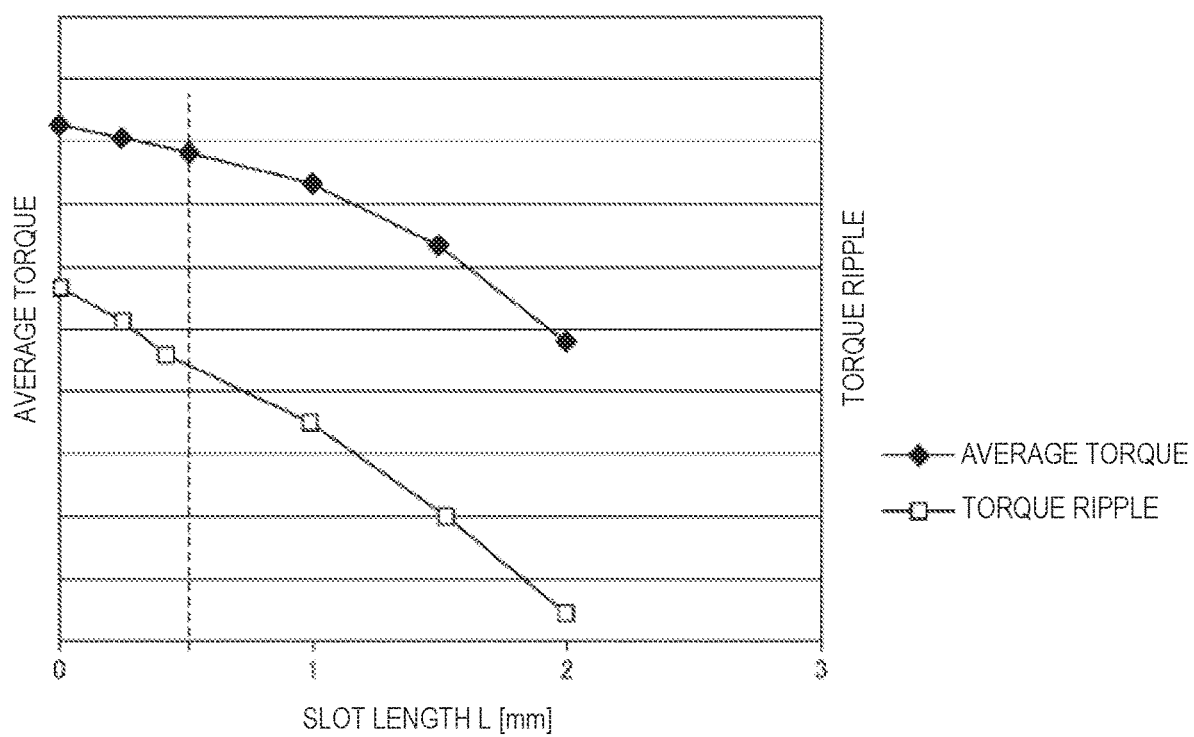
FIG. 7 is a graph illustrating a relation among a length of the hole portion, and average torque and the torque ripple of the rotary electric machine.

FIG. 7 is a graph illustrating a relation among the length L of the hole portion 45 in the direction of the major axis, and average torque and the torque ripple of the rotary electric machine. As illustrated in FIG. 7, as the length L of the hole portion 45 becomes longer, the torque ripple is reduced, but the average torque is also reduced. For this reason, the length L of the hole portion 45 is preferably set to about 0.5 mm at which a reduction in average torque is relatively small and an effect of reducing the torque ripple can be expected.

Figure 8:
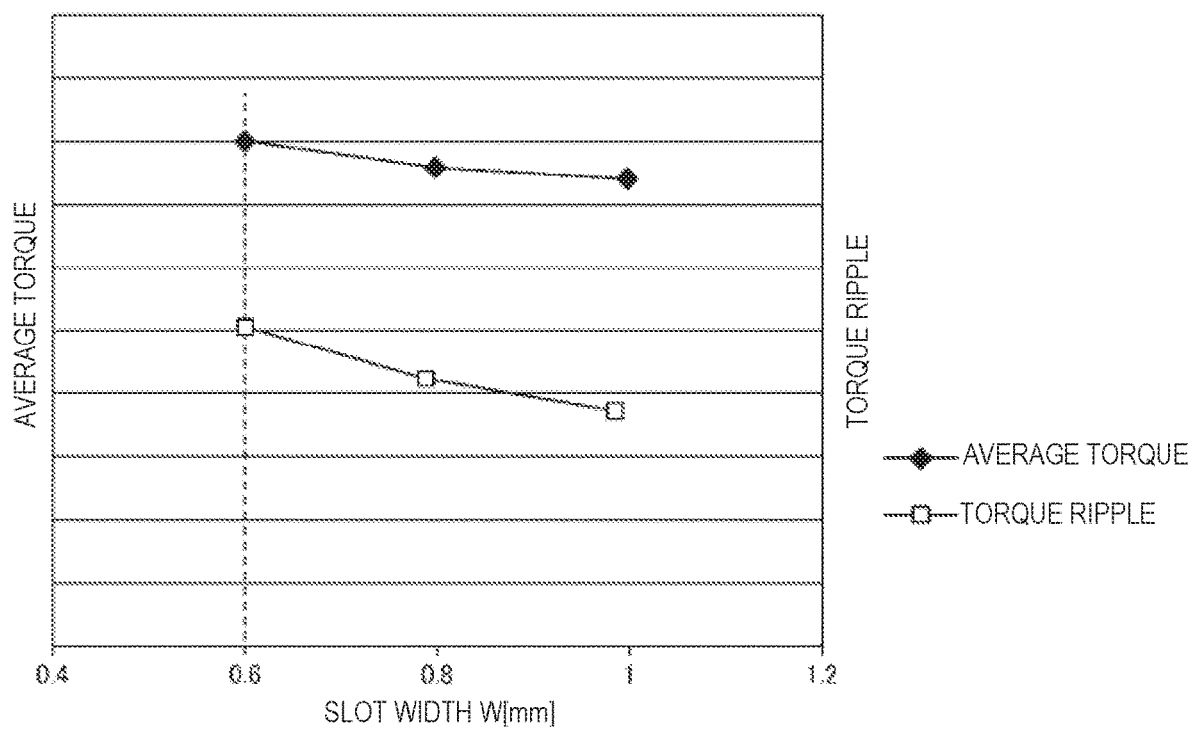
FIG. 8 is a graph illustrating a relation among a width of the hole portion, and the average torque and the torque ripple of the rotary electric machine.

FIG. 8 is a graph illustrating a relation among the width W of the hole portion 45 in the direction of the minor axis, and the average torque and the torque ripple of the rotary electric machine. As illustrated in FIG. 8, as the width W of the hole portion 45 becomes greater, the torque ripple is reduced, but the average torque is also slightly reduced. Considering a relation (W≥2t) between the width W of the hole portion 45 and the thickness t of one electromagnetic steel sheet 21 forming the rotor core 20, the width W of the hole portion 45 is preferably set to about 0.6 mm when the thickness t of the electromagnetic steel sheet 21 is 0.3 mm.

As described above, according to the present embodiment, the hole portion 45 is formed in the rotor yoke 40d, which forms the outer circumferential side relative to the magnet inserting hole 40 of the rotor core 20, approximately on the d-axis of each of the magnetic pole parts 50 formed by the permanent magnets 30. When the hole portion 45 is provided, the torque ripple of the rotary electric machine can be reduced as illustrated in FIGS. 6 to 8. When the rotary electric machine having the rotor 10 of the present embodiment is mounted in the vehicle, the silence of the vehicle is improved. An amount of the magnetic flux flowing from the rotor 10 to the stator is adjusted by the hole portion 45, an abrupt change in magnetic flux in a gap between the outer circumferential surface 20a of the rotor core 20 and the stator can be prevented, and magnetic loss is prevented. Further, the hole portion 45 is provided as the air gap, so that weight of the outer circumferential side relative to the magnet inserting hole 40 of the rotor core 20 is reduced. Thus, a centrifugal force occurring during rotation is reduced, and the rotor 10 can be rotated at a higher speed.

Since the hole portion 45 is a long hole having the major axis directed in the radial direction of the rotor core 20, the torque in the region of the low advance angle is not reduced, and the torque ripple can be reduced in the region in which the advance angle is advanced.

Since the rotor core 20 is formed by the plurality of stacked electromagnetic steel sheets 21, and the width W of the hole portion 45 in the direction of the minor axis is equal to or greater than twice of the thickness t of one electromagnetic steel sheet 21 forming the rotor core 20, the wear of the metal mold can be reduced when the electromagnetic steel sheet 21 is formed by punching using the metal mold. As a result, the life of the metal mold is prolonged.

Second Embodiment

Figure 9:
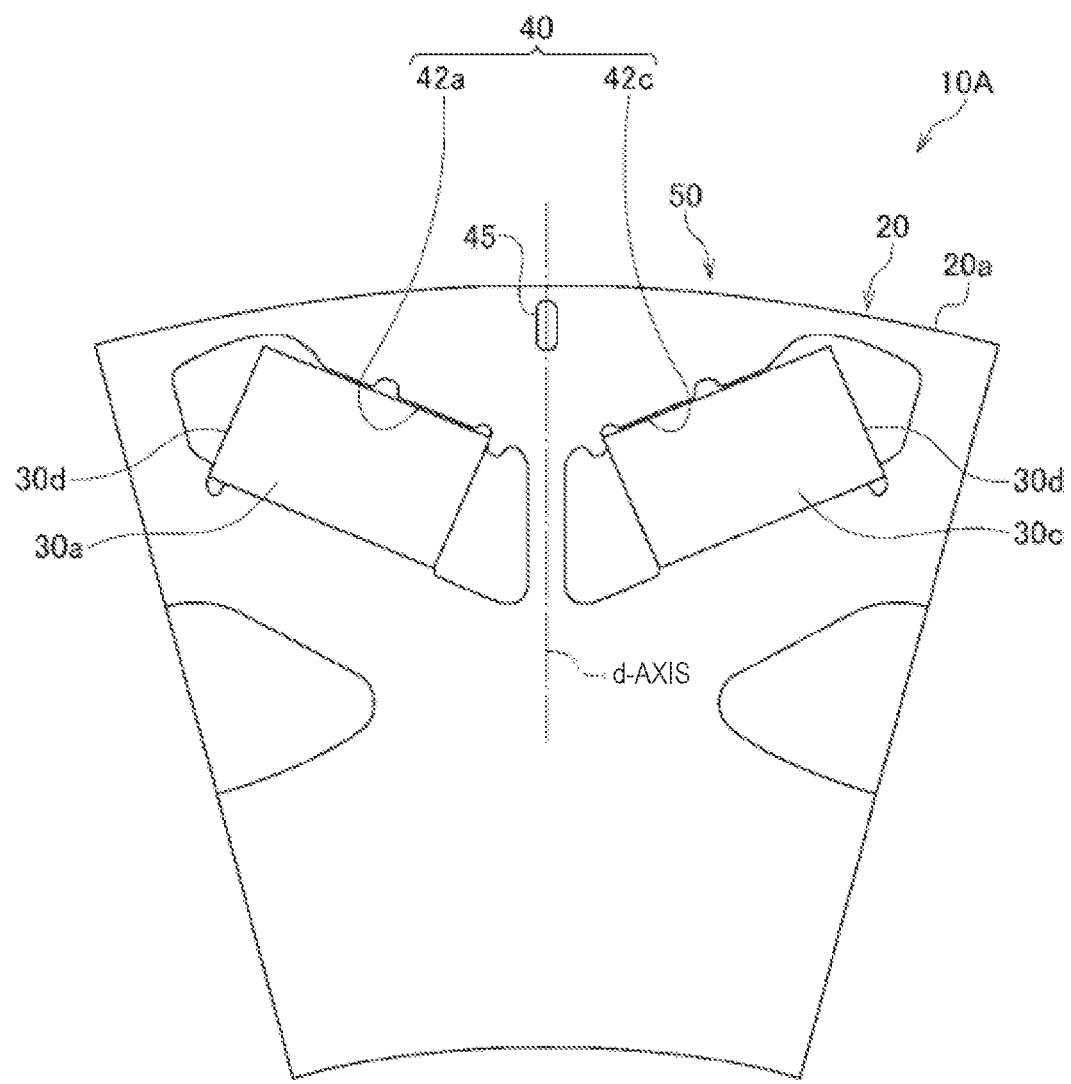
FIG. 9 is an enlarged front view of a main part of a rotor for a rotary electric machine according to a second embodiment.

FIG. 9 is an enlarged front view of a main part of a rotor for a rotary electric machine according to a second embodiment. A rotor 10A for the rotary electric machine of the second embodiment is different from the rotor 10 for the rotary electric machine of the first embodiment in that one magnetic pole part 50 is formed by two permanent magnet pieces 30a and 30c disposed in a magnet inserting hole 40 formed in an approximate V shape. A configuration other than this point is the same as in the first embodiment, and components common with those of FIG. 1 are given the same reference signs in FIG. 9.

In the rotor 10A for the rotary electric machine of the second embodiment, similarly to the rotor 10 for the rotary electric machine of the first embodiment, an effect of reducing torque ripple due to a hole portion 45 can be obtained.

Third Embodiment

Figure 10:
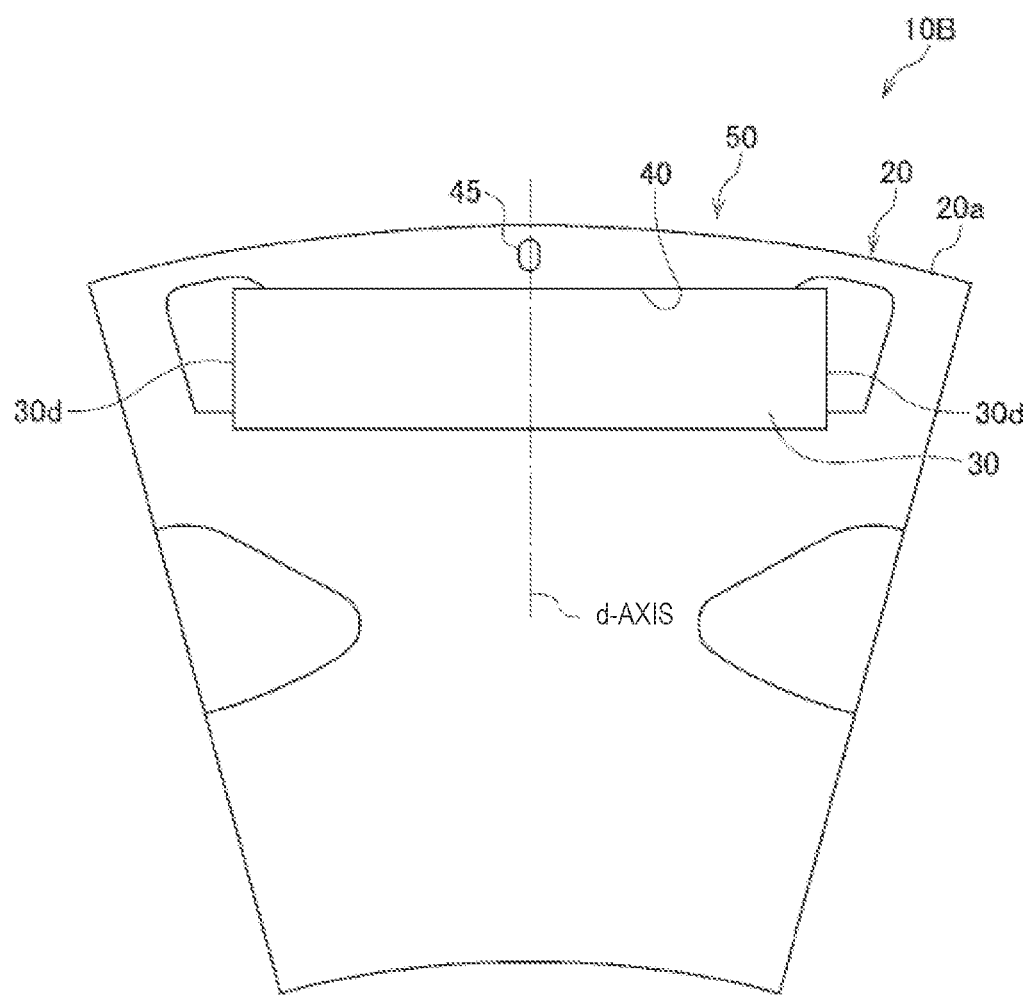
FIG. 10 is an enlarged front view of a main part of a rotor for a rotary electric machine according to a third embodiment.

FIG. 10 is an enlarged front view of a main part of a rotor for a rotary electric machine according to a third embodiment. A rotor 10B for a rotary electric machine of the third embodiment is different from the rotor 10 for the rotary electric machine of the first embodiment in that one magnetic pole part 50 is formed by one permanent magnet 30 disposed in a magnet inserting hole 40 formed in a linear shape in a direction perpendicular to a radial direction of the rotor 10B of the rotary electric machine. A configuration other than this point is the same as in the first embodiment, and components common with those of FIG. 1 are given the same reference signs in FIG. 10.

In the rotor 10B for the rotary electric machine of the third embodiment, since reluctance torque is low, an effect of reducing torque ripple due to a hole portion 45 is low. However, the effect can be obtained compared to a case where no hole portion 45 is formed.

The present invention is not limited to the above embodiments, and modification, improvement, or the like can be made appropriately.

DESCRIPTION OF REFERENCE NUMERALS AND CHARACTERS 10, 10A, 10B rotor
20 rotor core
21 electromagnetic steel sheet
30, 30A, 30B permanent magnet
30a, 30b, 30c permanent magnet piece
40 magnet inserting hole
40a, 40b, 40c hole
40d rotor yoke
45 hole portion
50, 50A, 50B magnetic pole part
D depth of hole portion
L length in a direction of major axis of hole portion
W width in a direction of minor axis of hole portion
t thickness of electromagnetic steel sheet

The invention claimed is:

1. A rotor for a rotary electric machine comprising:
a plurality of magnetic pole parts arranged at predetermined intervals in a circumferential direction; and
a rotor core formed of a magnetic material and having a substantially annular shape,
wherein each of the magnetic pole parts is configured by three permanent magnet pieces arranged in a substantially V shape,
wherein the rotor core includes a rotor yoke forming an area surrounded by an outer circumference of the rotor core and the three permanent magnet pieces,
wherein the rotor yoke has a hole portion substantially on a d-axis of each of the magnetic pole parts, and
wherein the hole portion does not obstruct a magnetic path formed at the rotor yoke in a region where the rotary electric machine has a low advance angle, and obstructs the magnetic path formed at the rotor yoke in a region where the rotary electric machine has a high advance angle.

2. The rotor according to claim 1,
wherein the hole portion is a long hole having a major axis directed in a radial direction of the rotor core.

3. The rotor according to claim 2,
wherein the rotor core is formed of stacked steel sheets, and
wherein a width of the hole portion in a direction of a minor axis is equal to or greater than twice of a thickness of one steel sheet forming the rotor core.

4. The rotor according to claim 2,
wherein a depth from an outer circumferential surface of the rotor core to a center of the hole portion in a direction of the major axis is less than a half of a thickness of the rotor yoke in a direction of the d-axis.

5. The rotor according to claim 1,
wherein in each of the magnetic pole parts, the three permanent magnet pieces are inserted into three holes formed in the rotor core in a substantially V shape,
wherein the three holes include a center hole arranged at a position intersecting the d-axis of each magnetic pole part, and a pair of circumferential side holes arranged at circumferentially both sides of the center hole,
wherein an outer diameter wall surface of the center hole has a straight shape which perpendicularly intersects the d-axis of each magnetic pole part,
wherein the outer diameter wall surface of the center hole has a void portion protruding radially outward at a position intersecting the d-axis, and
wherein the hole portion of the rotor yoke is formed at a position intersecting the d-axis circumferentially within circumferential both ends of the void portion.

6. The rotor according to claim 1,
wherein the rotor yoke has a single one hole portion for each of the magnetic pole parts.

* * * * *